United States Patent [19]

Hart

[11] 4,329,371
[45] * May 11, 1982

[54] METHOD OF PROCESSING GRAIN

[75] Inventor: Edwin R. Hart, Allen, Tex.

[73] Assignee: Seven-H Corporation, Richardson, Tex.

[*] Notice: The portion of the term of this patent subsequent to Nov. 21, 1995, has been disclaimed.

[21] Appl. No.: 962,558

[22] Filed: Nov. 20, 1978

Related U.S. Application Data

[63] Continuation-in-part of Ser. No. 729,376, Oct. 4, 1976, Pat. No. 4,126,707.

[51] Int. Cl.³ .......................... A23L 1/10; A23L 1/20
[52] U.S. Cl. .................................... 426/461; 99/520; 99/539; 99/601; 99/612; 241/7; 241/9; 241/12; 426/462; 426/463; 426/464; 426/472; 426/473; 426/481; 426/482; 426/483; 426/489; 426/507; 426/508; 426/510; 426/518; 426/807
[58] Field of Search ............... 426/618, 619, 622, 623, 426/627, 629, 630, 634, 635, 653, 419, 443, 459, 460, 461, 462, 463, 464, 465, 467, 481, 482, 483, 489, 507, 518, 807, 508, 510, 519, 472, 473; 99/483, 485, 518, 520, 537, 538, 539, 540, 568, 569, 571, 574, 575, 600, 601, 612; 241/7, 9, 10, 11, 12; 415/89

[56] References Cited

U.S. PATENT DOCUMENTS

| | | | |
|---|---|---|---|
| 1,035,839 | 8/1912 | Anderson | 426/462 |
| 1,258,076 | 3/1918 | Woolner | 241/7 |
| 2,329,403 | 9/1943 | Logue | 426/482 |
| 2,620,841 | 12/1952 | Jacobson | 426/482 |
| 2,806,501 | 9/1957 | Van Disk | 426/482 |
| 3,222,183 | 12/1965 | Rozsa et al. | 426/482 X |
| 3,419,056 | 12/1958 | Girgis | 426/482 |
| 3,477,855 | 11/1969 | Freeman | 426/482 X |
| 3,962,479 | 6/1976 | Coldren | 426/462 X |
| 4,126,707 | 11/1978 | Hart | 426/462 |

*Primary Examiner*—Arthur L. Corbin
*Attorney, Agent, or Firm*—Hubbard, Thurman, Turner, Tucker & Glaser

[57] ABSTRACT

Methods and apparatus for processing grain to provide meal, grit, flour and masa products suitable for human consumption and by-products suitable for use as animal feed and industrial products. The methods includes forming a slurry of the grain with water and processing the slurry through dehusking, germ detaching, grinding and sifting stages while maintaining the grain at a relatively high moisture content. Partially different methods are employed depending on whether the processed grain is sorghum, wheat or corn. The processing apparatus includes a dehusking unit having a plurality of pump stages to remove the husks from the grain kernels without cracking a substantial portion of the kernels. A fluidized bed dryer is utilized to remove excess water and to surface dry the kernels and husks. For sorghum grains a centrifugal impact germ detacher is utilized to break up the dehusked kernel and separate the germ and oil from the endosperm. Conventional sizing, separating and milling units are used to produce flour, meal, grit and feed products.

27 Claims, 15 Drawing Figures

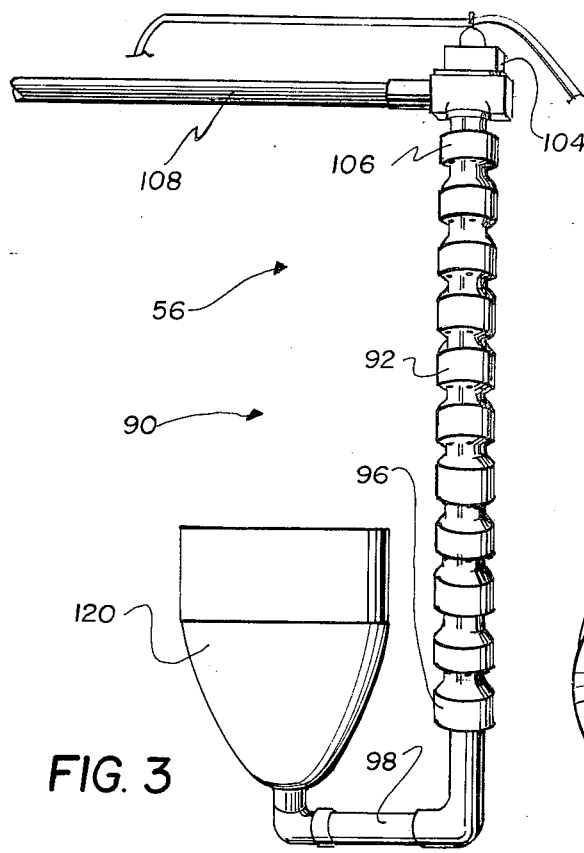
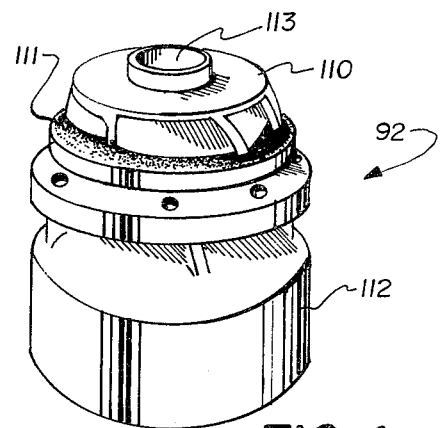
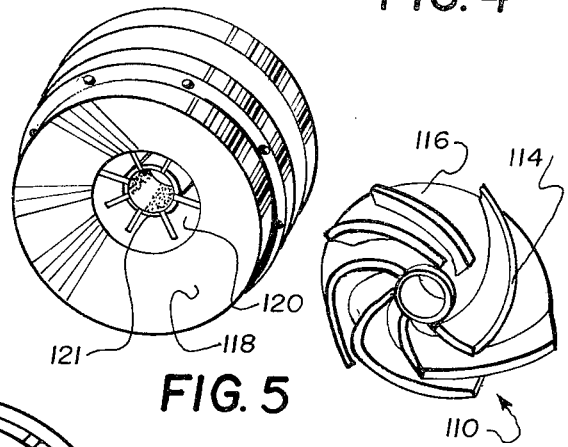
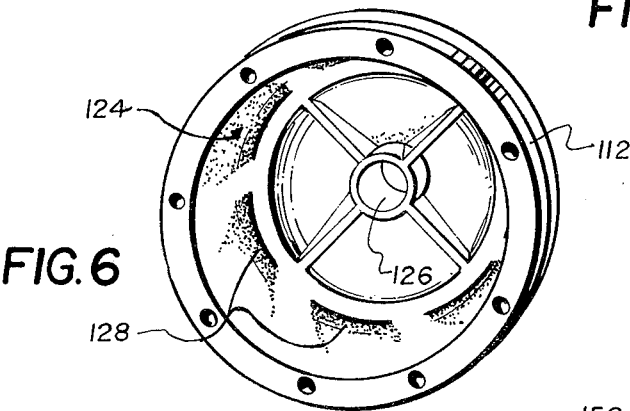
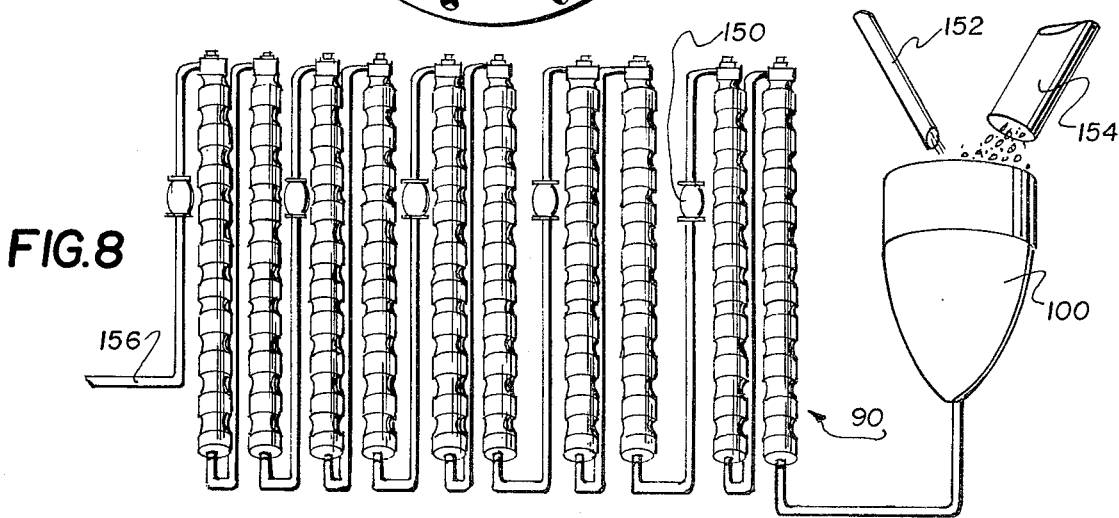

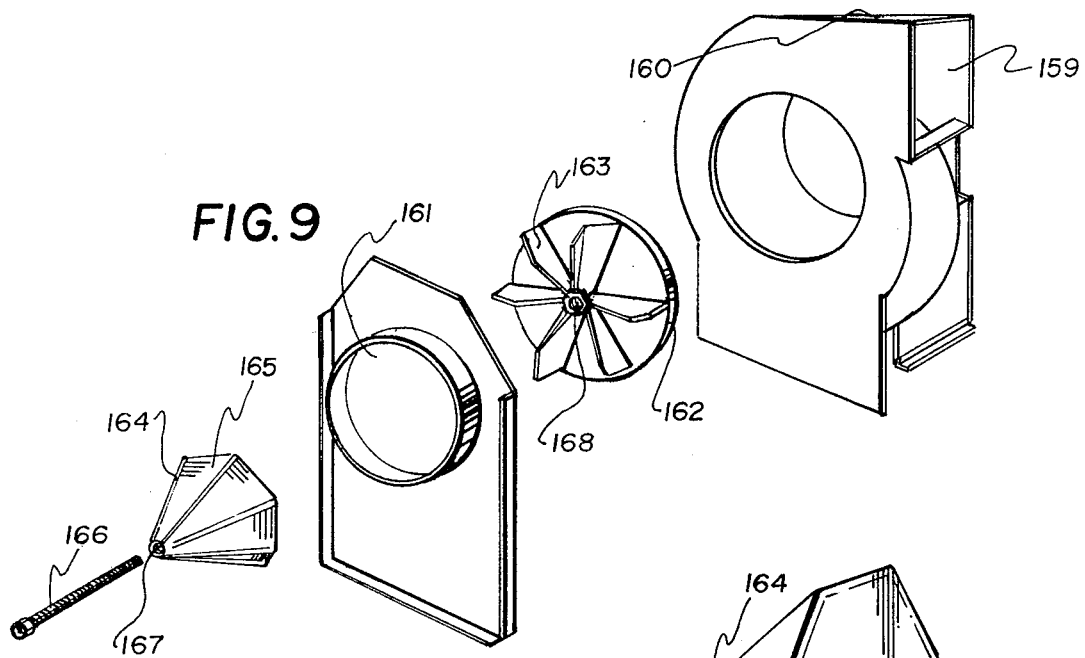
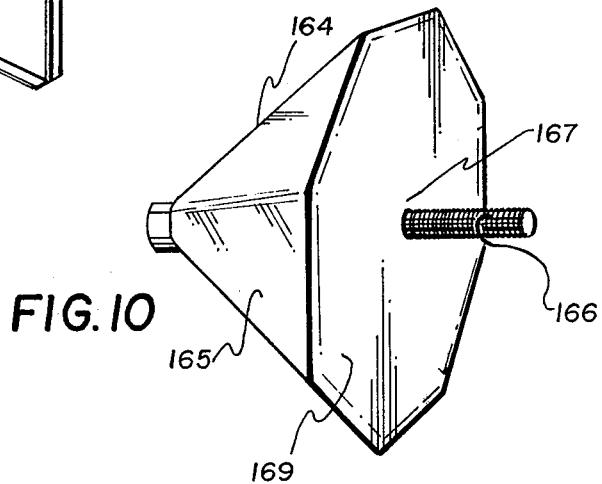
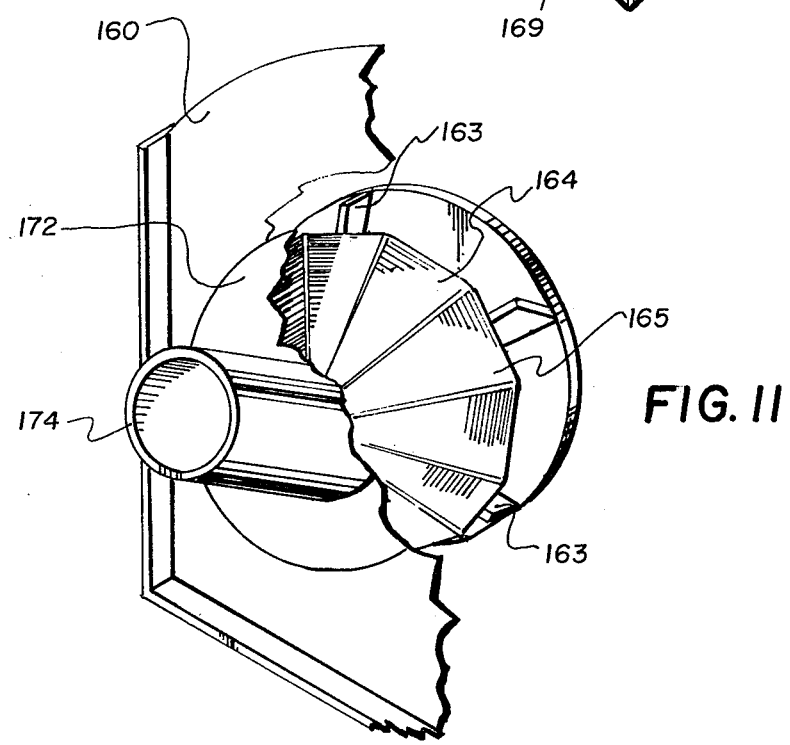

METHOD OF PROCESSING GRAIN

RELATED APPLICATIONS

This is a continuation-in-part of U.S. Patent Application Ser. No. 729,376 filed Oct. 4, 1976 and issued as U.S. Pat. No. 4,126,707 on Nov. 21, 1978.

BACKGROUND OF THE INVENTION

This invention relates to the processing of grains and, more particularly, to improved processes and apparatus for dehusking, drying, cracking and milling grains, particularly grain sorghums.

Grain sorghums offer a tremendous potential as a world food supply. Sorghums grow over a wide range of climatic conditions. They provide a higher yield per acre than smaller cereal grains, comparable to or greater than corn. Additionally, grain sorghums have a higher protein content than corn, although less than that of hard winter wheat. However, in spite of the foregoing advantages, grain sorghums such as milo are used for human consumption primarily only in underdeveloped and developing countries. In the United States and other highly developed countries such sorghums are used mainly for animal feed. This is due to the fact that flour milled by conventional processes from grain sorghums has a bitter taste from the tannic acid content of the sorghum husks. Also, the color of the conventionally processed sorghum flour makes it undesirable for baked goods. Additionally, it has been found that if a conventional roller mill is used in processing grain sorghums, the flour has a gritty aftertaste.

Suitable methods and apparatus have been needed for processing grain sorghums to overcome the foregoing disadvantages because flour or meal made from grain sorghums has the potential for being a superior food product. Such meal has a low gluten content making it desirable for producing soft baked goods. When grain sorghum flour is blended with wheat flour, the mixture has baking qualities equivalent to soft wheat flour but at a savings in cost on the order of at least 10%. By controlling the ratio of sorghum meal to wheat flour, the quality of the mixture can be maintained constant, even though the quality of the individual flour may vary as a result of changing climatic conditions. Additionally, flour produced from grain sorghum is bland and accepts flavors very well, thereby reducing the amount of flavoring and sweeteners required by many recipes. Still further, grit by-products from the processing of grain sorghums can be utilized to replace corn grit in extruded food products at savings in the order of 10%. This grit in large particles can also be substituted for rice with a higher nutritional value at less than half the cost and can be precooked and reshaped to be equivalent to instant rice products. The grit products tend to hold up better than similarly prepared rice, and can be prepared in the same manner as regular rice.

Thus, with proper processing methods and apparatus, grain sorghums have the potential of providing economical food products which additionally gives the capability to develop new product and flavors.

SUMMARY OF THE INVENTION

In accordance with the principles of this invention, an improved method for the processing of grain includes the steps of mixing water with the grain to form a slurry, pumping the slurry successively throughout a plurality of pump stages to separate the husks from the kernels of the grain without cracking a substantial percentage of the kernels, removing the water from the grain slurry, surface drying the grain, and aspirating the grain to remove the husks from the kernels.

The process may be used for all types of grains including corn and grain sorghum such as milo. In processing milo, the aspirated kernels are cracked to break up the kernels and to separate the germ and oil from the endosperm of the kernels. The broken particles are then sized and separated and milled into flour. Valuable germ, oil, feed and grit products are obtained. In further processing corn, the aspirated kernels are steam cooked and ground while still wet. The kernels are then dried to yield masa.

In another embodiment of the present invention, dehusking apparatus is provided for processing grain in a slurry to separate the husks from the kernels of the grain. A plurality of serially-connected turbine pump assemblies each has a turbine pump housing and a rotatable turbine pump impeller spaced from the pump housing. The grain is passed through the space between the impeller and the housing as whole kernels to thereby separate the husks from the kernels without cracking a substantial percentage of the kernels. The rotatable turbine pump impeller preferably has a plurality of curved blades spaced circumferentially around the front surface, each blade curving from the center to the periphery of the impeller. The pump housing includes a surface spaced from the impeller surface and shaped to conform to the impeller surface.

In another embodiment of the present invention, apparatus is provided for surface drying the grain, including a drying bed having a fine mesh screen forming the bottom of the bed. An input opening at one end of the bed directs grain onto the screen and an output opening at the other end of the bed discharges grain from the screen. An air unit below the drying bed directs an even flow of air upward through the screen of the bed. A reciprocating unit is attached between the air unit and the drying bed to rock the bed longitudinally in the direction of travel of the grain along the screen.

In yet another embodiment of the present invention, apparatus is provided for cracking grain and detaching germ and oil from the starchy grain particles. A rotatable fan member has a plurality of blades extending radially about the surface of the member. A feed member directs grain to the fan for cracking and an output member removes the grain from the fan after being cracked. A guide member is positioned to direct the grain to impact only a certain portion of the fan blades so as to provide for uniform cracking of the grain.

DESCRIPTION OF THE DRAWINGS

The foregoing will be more readily apparent upon reading the following description in conjunction with the drawings in which:

FIG. 3 is a perspective side view of the one stage of the dehusker according to FIG. 1;

FIGS. 4–6 are perspective views of the turbine pump of the dehusker shown in FIG. 3;

FIG. 8 is a front perspective view of the dehusking unit of FIG. 1 incorporating dehusking stages according to FIG. 3;

FIG. 9 is an exploded view showing the centrifugal impact germ detacher according to FIG. 1;

FIG. 10 is a bottom perspective view of the cone of the germ detacher shown in FIG. 9;

FIG. 11 is a front perspective, partially cutaway view of the germ detacher of FIG. 9;

DESCRIPTION OF THE PREFERRED EMBODIMENT

Figure 1:
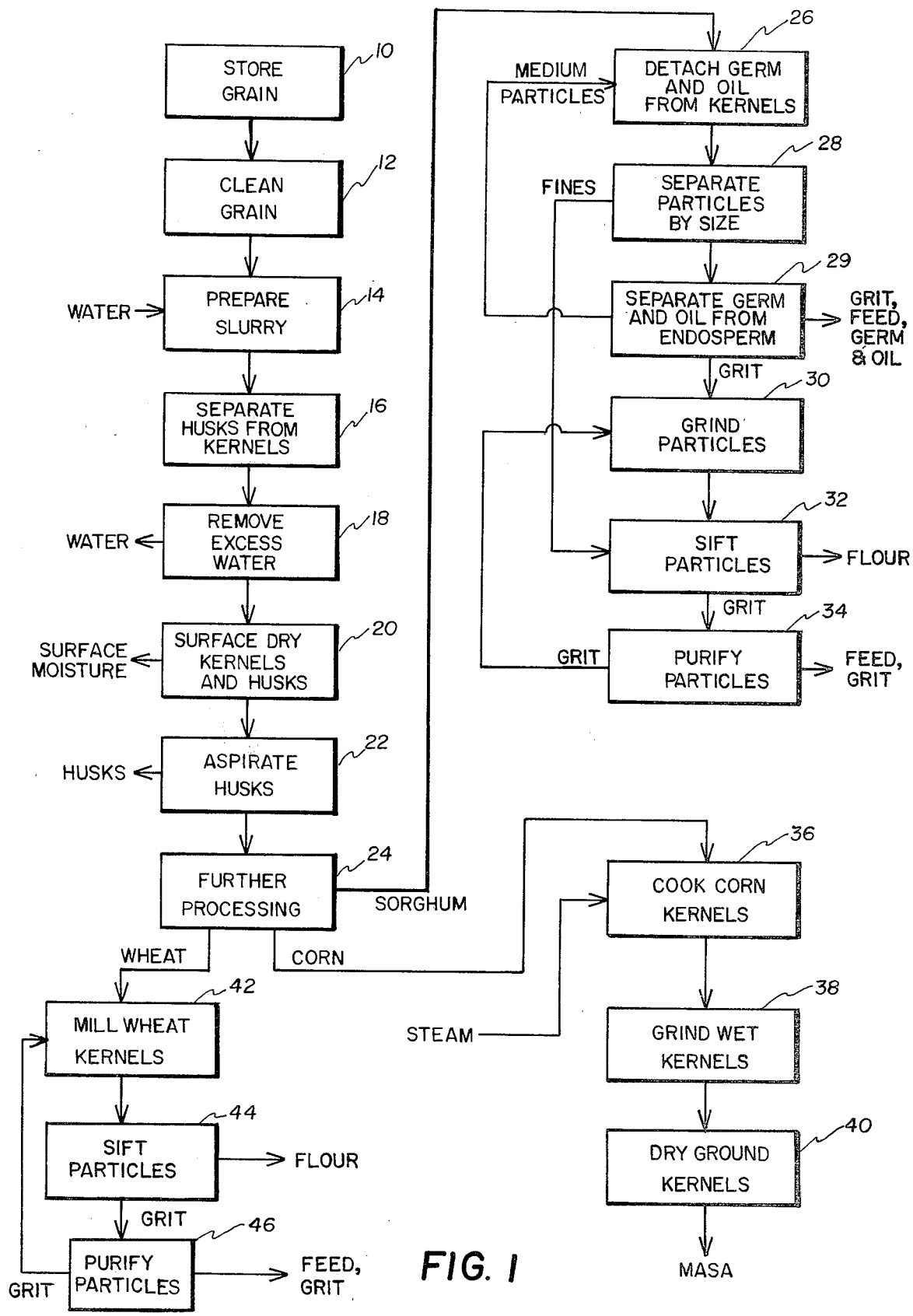
FIG. 1 is a flow diagram illustrating steps in accordance with the principles of this invention for processing grain.

Referring now to FIG. 1, shown therein is a flow diagram of an improved method for processing grain utilizing the present invention. This method is especially useful in the processing of grain sorghums and in particular for the processing of milo. Grain is first removed from storage, step 10, and then cleaned at step 12, to remove dirt, trash and cracked, damaged or small seed as well as other grains which may be utilized as feed. A conventional cleaner may be utilized such as that used for cleaning seed. The cleaned grain may then be put in intermediate storage or further processing may immediately begin.

To continue processing the grain, it is sent to a tank at step 14 for mixing with water to form a heavy slurry. During the mixing process, the water level in the mix tank is preferably maintained so that there is about two pounds of water for every one pound of grain. It has been found that this heavy slurry gives improved results, but the ratio of water to grain is not critical.

The slurry is then processed to separate the husks from the kernels at step 16. This step is preferably performed by a plurality of pumping stages which will be discussed in detail below. The excess water is then removed from the slurry at step 18, and the kernels and husks are surface dried, step 20, preferably by means of a fluidized bed dryer which only removes the surface moisture. In effect, the surface drying only dries the husks and the surface of the kernels while much of the internal moisture of the kernels remains. Finally, the surface dried mixture of husks and kernels are aspirated to remove the dried and lighter husks, at step 22.

The step of surface drying is relatively short, normally about six minutes, and provides many advantages. Primarily, the cost of drying is significantly reduced, a relatively low temperature of approximately 150° F. being used. It has also been found that if the kernels of the grain sorghum are moist, the succeeding process steps are much more effective. A moisture content of approximately 22% at the output of the fluidized bed dryer is preferable. It is only necessary that the husk be sufficiently dry to be removed by the aspirator. While the surface moisture is removed, much of the internal moisture remains.

After the initial process described above, further processing may be initiated at step 24 depending on the type of grain being processed. For further processing of dehusked grain sorghum kernels, the dehusked kernels are first sent to a centrifugal impact germ detacher, discussed later, to separate the germ and oil from the kernal, at step 26. The impact of the blades of the detacher striking the kernels causes germ and oil to be detached from the kernels and the kernels to be broken into smaller pieces. The presence of internal moisture contributes to better separation of the germ and oil from the endosperm. These pieces are then separated according to size at step 28 and the germ and oil are separated from the endosperm according to specific gravity at step 29, yielding some feed and grit.

The lighter mass particles contain the germ and oil of the kernels and may be used as a feed product or may be processed for use as light cooking oil. The medium density particles usually comprise some germ or oil attached to an endosperm particle, and are returned for further processing by the detacher. The heavy endosperm particles can be used at this stage as a grit product in place of rice or can be sent on to a mill stage, step 30. The output product passes through an air filter and is sifted at 32 to form flour suitable for human consumption. Small grit particles are passed to a purifier at 34 for further cleaning and are either returned to the mill, if only flour is desired, or are stored as grit products suitable, for example, for making extruded food products.

The method disclosed in FIG. 1 may also be applied for dehusking corn and wheat. It has been found that utilizing this method, a substantial savings in capital equipment cost and operating cost may be achieved due to the fact that a continuous process is utilized rather than a conventional batch process for dehusking corn. For wheat processing, the present method also offers substantial savings in operating and capital costs since the wheat passed through only one grinding unit and no recycling of the product is needed, in contrast to conventional roller mill operations.

To manufacture masa, a corn meal product, the corn is first dehusked according to the method of FIG. 1 described above. The dehusked corn is then cooked, at 36, utilizing steam. The cooking preferably lasts about 18 minutes, depending on the required glutenization. The cooked corn is then sent through a wet grind stage, at 38, and the ground kernels are dried, at step 40, to form the masa. In one preferred embodiment, the ground kernels are air column dried. This process is a significant improvement over prior art methods which require adding lime and boiling to glutenize the starches, and steeping at 150° F. for nine to 18 hours to remove the husk. It is important to note that the quality of corn required for making masa using the process of the present invention is much lower than that required in conventional processes, since kernels with stress fractures can be used and flavoring and nutritional values are not leeched out by long soaking periods.

If it is desired to process wheat which has been dehusked using the method described previously, the dehusked wheat is milled, at step 42, to form wheat flour. Preferably, the wheat is reduced to fine particles by impact grinding rather than by gradual reduction using roller mills as is presently done in the trade. Additional sifting and purifying steps, 44 and 46 respectively, are preferably included. Other grains such as barley and oats may be similarly processed to yield flour and by-products.

Accordingly, there has been described an improved method for processing grain sorghums, which method may also be utilized for dehusking corn and wheat with a substantial savings in both capital equipment costs and operating expenses. When grain sorghums are processed, according to the disclosed method, the resulting product is substantially less expensive than a corresponding wheat product. A low gluten flour is produced which is especially good for baking soft goods, this flour being bland and accepting flavoring and sweeteners very well. By-products include animal feed having a value which will be nearly equal to the cost of the grain being processed. A grit suitable for use as a rice substitute, but which is more nutritional and less than one-half the cost of commercially available rice products, can be obtained. The grit can also be utilized to manufacture extruded food products. It is thus apparent that the improved method according to this invention is a substantial improvement over prior art methods and provides a new use for a widely available and highly advantageous grain.

Figure 2:
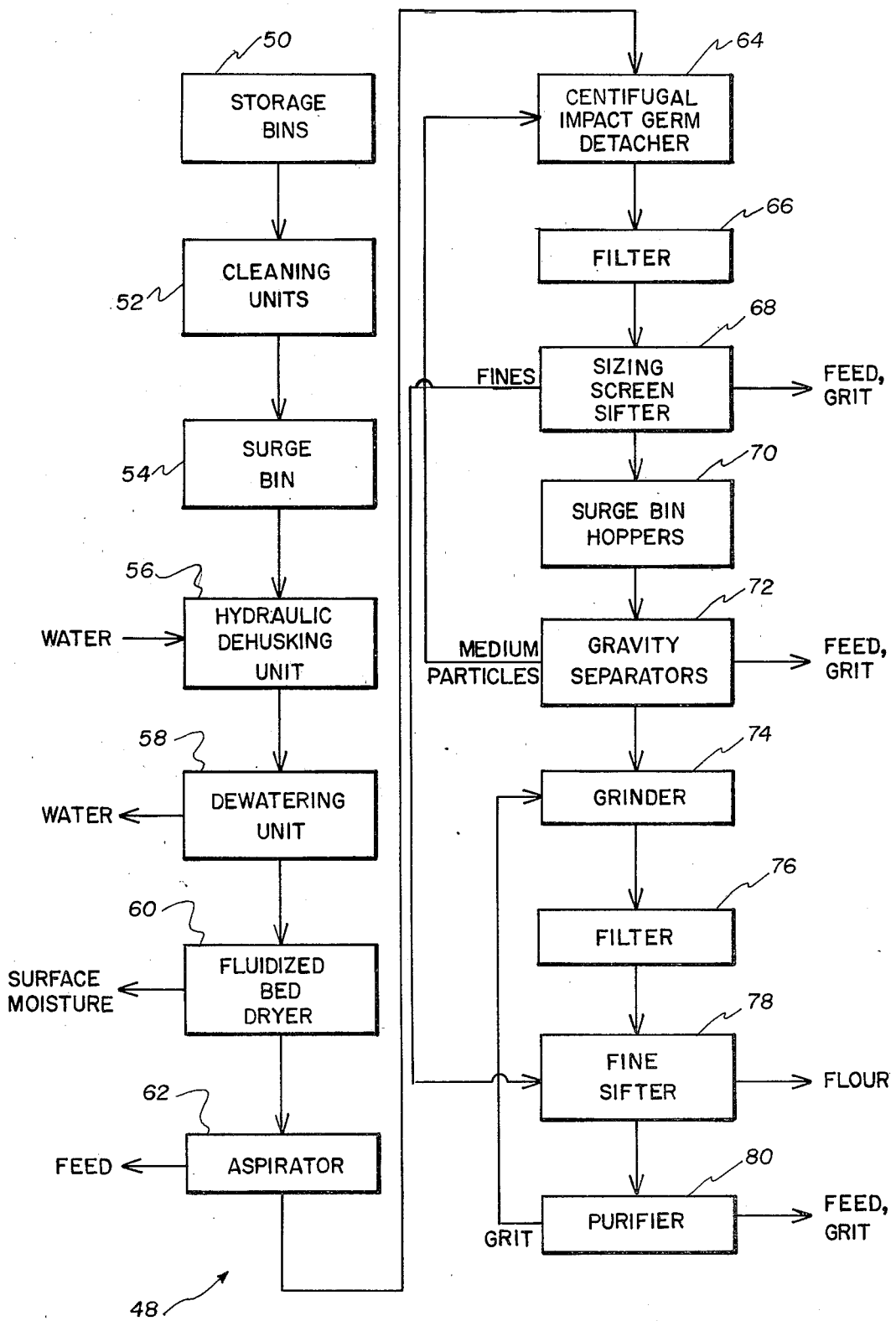
FIG. 2 is a block diagram showing the main components in a system for processing grain sorghum according to the method of FIG. 1.

Turning now to FIG. 2, a block diagram is shown of a system 48 utilizing the method of FIG. 1 to process grain sorghums. The disclosed system has been found to be especially useful in processing milo into usable products for human and animal consumption.

The grain is stored initially in storage bins 50 which are of conventional design and having any desired size. Typically, bucket elevators and other apparatus are utilized in conjunction with the storage apparatus. A number of preprocessing steps are normally performed involving conventional cleaning units 52. In one preferred embodiment these units include an aspirator and a sifter for removing dust and light particles, gravity tables for separating damaged and foreign particles by specific gravity and a destoner unit for removing pebbles, rocks and other heavy particles. The grain is then conveyed to a surge bin 54 to await processing.

The processing of the grain sorghum is initiated by mixing the grain from surge bin 54 with water to form a slurry. As previously mentioned, the mixing ratio is preferably about two parts water to one part grain although the ratio is not critical. This slurry is fed into a hydraulic dehusker 56 from the surge bin by a conventional feeder unit (not shown), preferably at a rate of about 6,000 pounds of grain per hour. The preferable water input rate in normal operation is about 1,500 gallons per hour. As will be discussed later, the dehusking unit 56 is a uniquely designed unit preferably having a series-connected set of ten pump stages, each stage having ten serially-connected turbine pumps therein. Conventional air valves acting as throttle valves control the flow of the slurry through the hydraulic dehusking unit to achieve optimal processing time.

After the slurry leaves hydraulic dehusker 56 it passes to a conventional dewatering unit 58 for removal of the excess water. Unit 58 is preferably a dewatering vibrator screen made by Smico Company. The moist kernels and separated husks are then passed to a fluidized bed dryer 60 in order to partially dry the husks and the surface of the kernels. Dryer 60 is of unique construction and design and will be discussed in greater detail later. It utilizes a mesh screen bed with a uniform flow of air from an air chest through the screen and a forward reciprocating motion of the bed to move the product along. This combination tends to separate the kernels and promotes drying with low static air pressure.

From the fluidized bed dryer 60 the product is passed to a conventional aspirator 62 to remove the dried husks from the mixture. The husks are directed to a feed storage hopper for use as animal feed. Preferably aspirator 62 is a four-pass model 4F24 built by Kice Metal Products Company of Wichita, Kans. The dehusked kernels are than passed to a centrifugal impact germ detacher 64 to break up the kernels and detach the germ and oil from the endosperm. Germ detacher 64, a unique apparatus which will be discussed in greater detail later, impacts the dehusked kernels uniformly so as to break up the kernels and cleanly separate the germ and oil from the endosperm.

The particles are then passed to a conventional filter 66, preferably comprised of a dust filter unit together with a rotary air lock, both manufactured by MAC Equipment, Inc. Unit 66 also preferably includes a Smico two-way stream divider directing two parallel streams of particles to a conventional sifter unit 68. This unit is preferably a six-section sifter having different mesh screens in each of two sections for filtering out different size particles. One preferred type of unit is a 6×19 swinging sifter made by Smico and having mesh screens in two sections numbered in sequence 7, 10, 14, 24 and 35. The large particles that do not pass through the number 7 mesh are skimmed off and directed to storage for feed. The small size particles which drop through the number 35 screen of sifter 68 are directed to a sifter 78 to be discussed later. The light particles are directed to feed storage. The remaining small particles are useful in making grit products suitable for human consumption, such as extruded snack foods. Alternately, the particles may be reground for flour. Output from the other four screens are sent to four surge bin hoppers 70 equipped with particle feeders, preferably Syntron feeders, model BF-2. Each feeder in turn directs the flow of particles to one of four corresponding gravity separators 72 which sort the particles according to specific gravity. These separators are preferably conventional units, model numbers 50 or 80, manufactured by Oliver Manufacturing Company, Rocky Ford, Colo.

Each of the gravity separators outputs three products depending on the specific gravity of the particles. Light particles are directed to feed storage or are further processed to extract oil. Medium size particles are directed back to germ detacher 64 to detach the germ and oil and further break up the particles. Heavy particles go to grit storage or to a grinder unit 74 depending upon whether grit or meal is desired. Grinder 74 is preferably an impact grinder such as the Simpactor model 6A made by Sturtevant of Dorchester, Mass. The grinder preferably operates at about 4,300 rpm and has removable "stator" pegs to vary the coarseness of the product to some degree.

From grinder 74 the finely ground particles pass into a pneumatic conveying system, through another conventional MAC dust filter 76 having a Smico two-way stream divider to a conventional sifter 78 preferably comprising two sections of a six-section swinging sifter Smico unit which also includes sifter 68. The ground particles are further sized by sifter 78 and the finest particles are directed to storage for flour. The other coarser particles are sent to a purifier unit 80, preferably a double-bed Smico-Morros unit, model No. TL2464. Purifier unit 80 cleans out any husks or light remaining particles which are sent to feed storage while the remaining particles are stored for grit or returned to the grinder for further processing.

With reference to FIGS. 3–8, the hydraulic dehusker 56 is shown in greater detail. FIG. 3 shows a ten-stage dehusking assembly 90 of the dehusker comprising ten turbine bowl assemblies 92 serially connected along a common shaft in an upright position. Preferably, each of the pumping stages utilizes a low efficiency open bowl turbine pump. The bottom bowl assembly 96 is connected by a tubing 98 to a surge bin 100 for receiving the grain and forming the water slurry for dehusking assembly 90. The central shaft 102 is driven by a hydraulic motor 104 mounted at the top of assembly 90. A discharge port 108 is disposed at a right angle to assembly 90 in communication with the uppermost bowl assembly 106.

Figures 7, 7A:
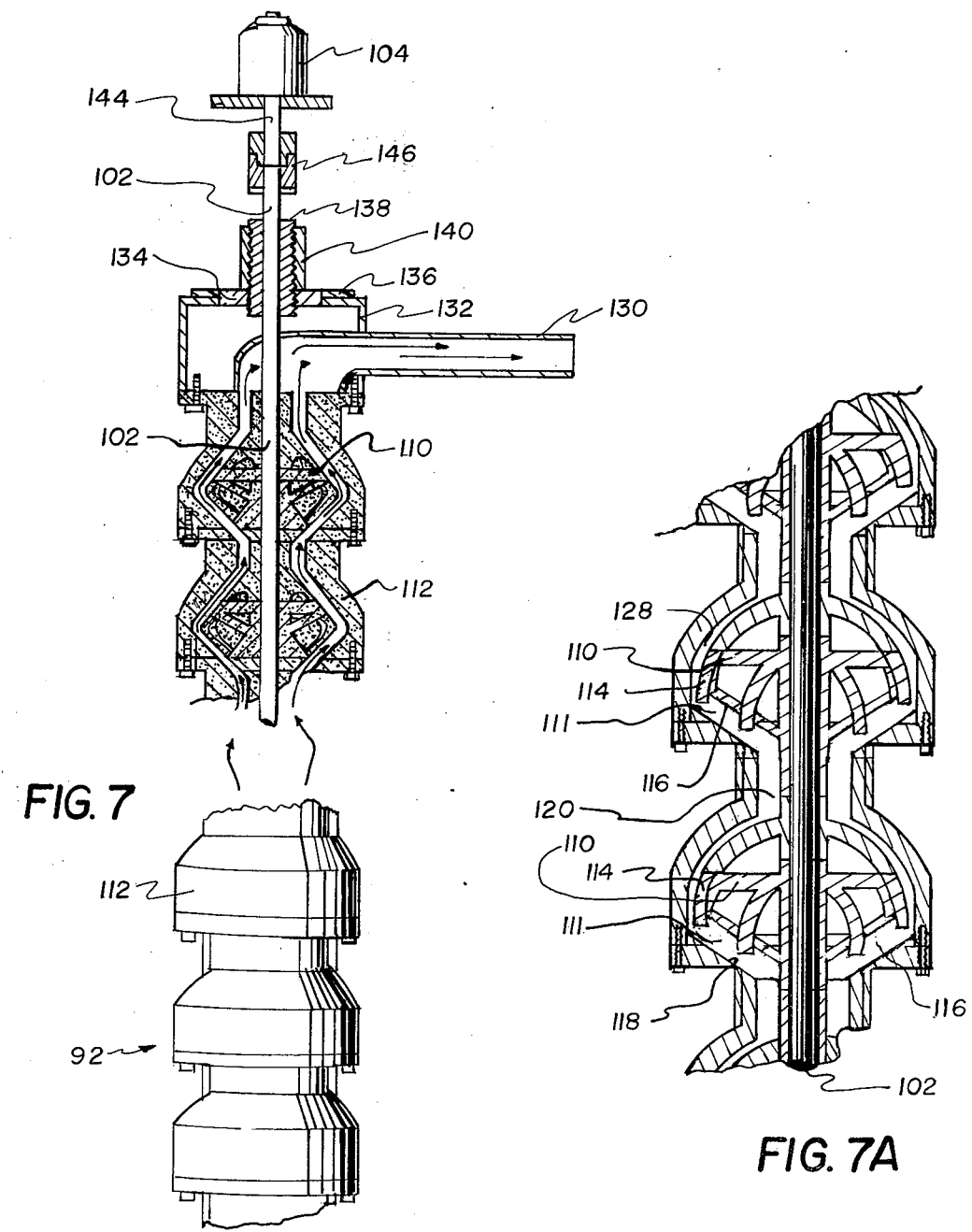
FIG. 7 is a partial cross-sectional view of the dehusker shown in FIG. 3.
FIG. 7A is a blown-up cross-sectional view of a bowl assembly of the dehusker shown in FIG. 7.

Looking now at FIGS. 4-6, each bowl assembly is comprised of two elements, an impeller 110 and a housing member 112. Impeller 110 has a central bore 113 to accommodate shaft 102 running therethrough as best seen in FIGS. 6 and 7. Impeller 110 is provided with a plurality of curved blades 114 spaced about a concave surface 116, and is mounted facing and spaced slightly from a concave bowl 118 at one end of housing member 112 to provide an opening 111. Bowl 118 has a centrally disposed bore 121 for accommodating shaft 102 and a central opening 120 communicating with a plurality of ports 122 spaced about central bore 121. The opposite end of housing 112 comprises a cylindrical bowl 124 having a circular bore 126 therein to accommodate the centrally disposed shaft 102. A plurality of openings 128 are spaced about the inside periphery of bowl 124 and communicate with ports 122 at the opposite end of housing member 112.

Looking now at FIGS. 7 and 7A, a cross-section of dehusking assembly 90 is shown. The housing members 112 of adjoining bowl stages are bolted together and shaft 102 is centrally disposed therethrough. Each impeller 110 is attached to the shaft to move vertically therewith. Positioned above discharge port 130 is a pump base 132 for supporting the driving mechanisms. A thrust bearing 134 is mounted on a plate 136 which in turn is supported by base 132. The thrust bearing 134 rotatably supports the weight of shaft 102 which extends through base 132, bearing 134, and plate 136. A collar 138 is mounted within the thrust bearing and is threaded about its periphery to mate with a round nut 140 resting on bearing 134 and having corresponding internal threading. A hydraulic motor 142 is positioned above collar 138 and has a downward extending shaft 144 which couples with drive shaft 102 by coupling member 146. Shaft 102 is raised and lowered in dehusking assembly 90 by turning nut 140 relative to collar 138 to move the shaft vertically. Preferably, the collar 138 and nut 140 are sufficiently threaded to provide for at least one-half inch of vertical adjustment of impellers 110 relative to housing members 112.

Dehusking assembly 90 may be serially interconnected by pipes 156 with other identical dehusking assemblies to form dehusker 56. Preferably, dehusker 56 is comprised of five pairs of dehusking assemblies 90 as shown in FIG. 8. A conventional valve 150 is positioned between each pair of stages to control the flow of slurry through unit 54. Valves 150 are preferably air-operated pinch valves which open and close by the action of air or hydraulic pressure on a resilient sleeve within the valve housing. One suitable type of valve for this application is a Red Valve, type A, made by Red Valve, Inc. of Carnegie, Pa. By using this type of valve, undesirable increases in internal system pressure will force the restricted sleeves open and allow the slurry to pass. Conventional mechanical valves, on the other hand, would maintain the restricted flow and cause damage or a shut-down of the system.

Impeller 110 and housing member 112 are preferably conventional turbine bowl components such as the Valley Lineshaft turbine pump components manufactured by Valley Pump Company of St. Louis, Mo. The impellers and housing members are preferably plated with electrolysis nickel and heat treated for hardening the surface and for safety in handling food materials. Pipes 156 interconnecting dehusking assemblies 90 are preferably made of stainless steel to resist corrosion and withstand the fluid pressure of the system.

In operation, shaft 102 is vertically positioned for each assembly 90 to obtain the desired spacing 111 between impellers 110 and housing members 112. The hydraulic motor 142 rotates the shaft 102 and its accompanying impellers 110 at a speed of between 1,250 to 1,750 rpm, depending upon the type of grain being processed. The grain slurry is fed from surge bin 54 upward through each assembly and out the discharge port 108. The slurry flows upward through each bowl assembly by following a path shown by the arrows from openings 128 through ports 122 to impeller 110. The slurry is spun outward through spacing 111 and into openings 128 of the next bowl assembly. This turbulent flow causes a loosening and removal of the husks from the kernels in the slurry. In one test, the grain was fed into bin 54 at a rate of about 6,000 pounds per hour while the rate of water usage was about 2,400 gallons per hour. Air valves 150 are normally operated at an air pressure of between 100 and 135 pounds per square inch depending upon the speed of hydraulic motors 142.

In processing grain sorghums such as milo, it is important to minimize the amount of time that the grain and water are mixed together. In contrast to wheat which becomes pliable when wet, milo becomes soft and mushy when thoroughly wet and is therefore prematurely broken up by the dehusking unit so that the desired product is not obtained. It therefore becomes important to minimize the retention time of the milo grain in the dehusker. The optimal approach is to dampen the milo grain to the point where the husks become wet and are easily separated by the impellers while minimizing the kernel moisture.

The primary variables which can be controlled in determining the retention time are the revolutions per minute of the hydraulic motors, the separation distance between the impellers and the housing members and the air valve pressure. The separation, best seen in FIG. 4 of distance 111, is very important for proper processing of the grain kernels to remove the husks without cracking a substantial number of the kernels and also determines the speed at which the slurry moves through the system. Satisfactory results have been achieved by raising the impellers to make the pump less efficient so that the distance 111 is about one and one-half times the size of an average kernel. In some instances, where the grain slurry is heavier or other products are being processed it may be found that different distances relative to the size of the kernel are ideal. In any event, the adjustment of the distance 111 is easily accomplished by turning nut 140 relative to collar 138 so as to raise or lower shaft 102, as best seen in FIG. 7.

The other major factors determining the retention time of the grain slurry in the dehusking unit are the revolutions per minute of the hydraulic motor and the air pressure in the air valves 150. By adjusting both of these variables one can easily reach an optimal retention time for each type of grain processed. This flexibility in adjusting the speed of the hydraulic motors is one of the major advantages of using hydraulic prime movers in the present system. In one example, milo grain was run through all ten stages 90 of dehusking unit 56 in about ten to twelve minutes with the hydraulic motors 142 running at a speed of about 1,700 rpm and the air valves set at about 135 pounds per square inch.

From the foregoing description it can be seen that the hydraulic dehusker 56 provides a much faster and more effective means of dehusking grain, particularly sorghum such as milo, to obtain usable kernels for human consumption. The extended prior art processes of soaking and steeping are not required. The husks are uniformly separated from the kernels while minimizing the amount of moisture absorbed by the kernels so that drying time is greatly reduced. Since the kernels are not thoroughly soaked, the husks can be removed from substantially all of the kernels in a short time period without cracking or damaging the kernels. Rapid removal of the husks without soaking also eliminates most of the bitter taste caused by the tannic acid of the husks of grain sorghums steeped according to conventional methods.

Referring now to FIGS. 9-11, the centrifugal impact germ detacher 64 is shown. Preferably, a conventional radial fan 160 is used with an open face material handling wheel 162 vertically mounted therein. The fan has a circular input opening 161 in the housing in front of wheel 162 and an outlet port 159 near the top of the housing. Wheel 162 has a plurality of blades 163 radiating from the wheel hub and spaced around the face of the wheel. One type of fan suitable for adaptation to this application is the MAC 35-30 centrifugal fan manufactured by MAC Equipment, Inc. Preferably, the fan is hydraulically powered and has a variable speed from about 100 rpm up to about 2,000 rpm to accommodate cracking different types of grain. For milo processing, the fan normally runs at about 1,100 rpm.

In order to utilitize fan 160 to impact grain kernels so as to detach the germ and oil, a cone-shaped feed control member 164 is attached to the face of material wheel 162. Cone 164 is preferably a hollow stainless steel member with a hole drilled through the center for receiving a bolt 166. A bore 168 disposed in the center of material wheel 162 is threaded to receive the end of bolt 166 and attach cone 164 to the wheel. As shown in FIG. 10 the base of cone 164 is flat to fit evenly against the outer edges of blades 163 of material wheel 162. As shown in FIG. 11 the base of cone 164 covers nearly all of blades 163 except the outer periphery portion 165. A drum-shaped housing 172 encloses the circular opening 161 of fan 160 and has an input spout 174 projecting outward to receive product into the detacher.

In operation, dehusked kernels of grain are fed through spout 174 to impact the spinning blades 163 of material wheel 162. Cone 164 is mounted on material wheel 162 so as to leave only the outer edges 165 of blades 163 exposed to impact the incoming kernels. The cone prevents the kernels from impacting other parts of blade 163 so that a consistent uniform cracking is achieved. As a result, by operating the fan at an optimal angular velocity, the particles are uniformly broken and the germ and oil are cleanly detached from the endosperm of the kernels. The resulting cracked product is directed out port 163 to the next unit in the processing system.

Another major advantage in using the germ detacher described above is the ability to crack the kernels at a substantially higher moisture content which will be described in detail later, thereby substantially reducing drying time and providing a cleaner separation of the germ and oil from the endosperm. The result is a flour with a relatively low fat content compared to flour from other processes and relatively clean by-products of germ and oil. Yet another advantage is that the detacher requires substantially less energy than with other systems. Typically, only a five horsepower motor is required for the germ detacher whereas a cracking roller would normally require about a 40 horsepower motor.

Figure 12:
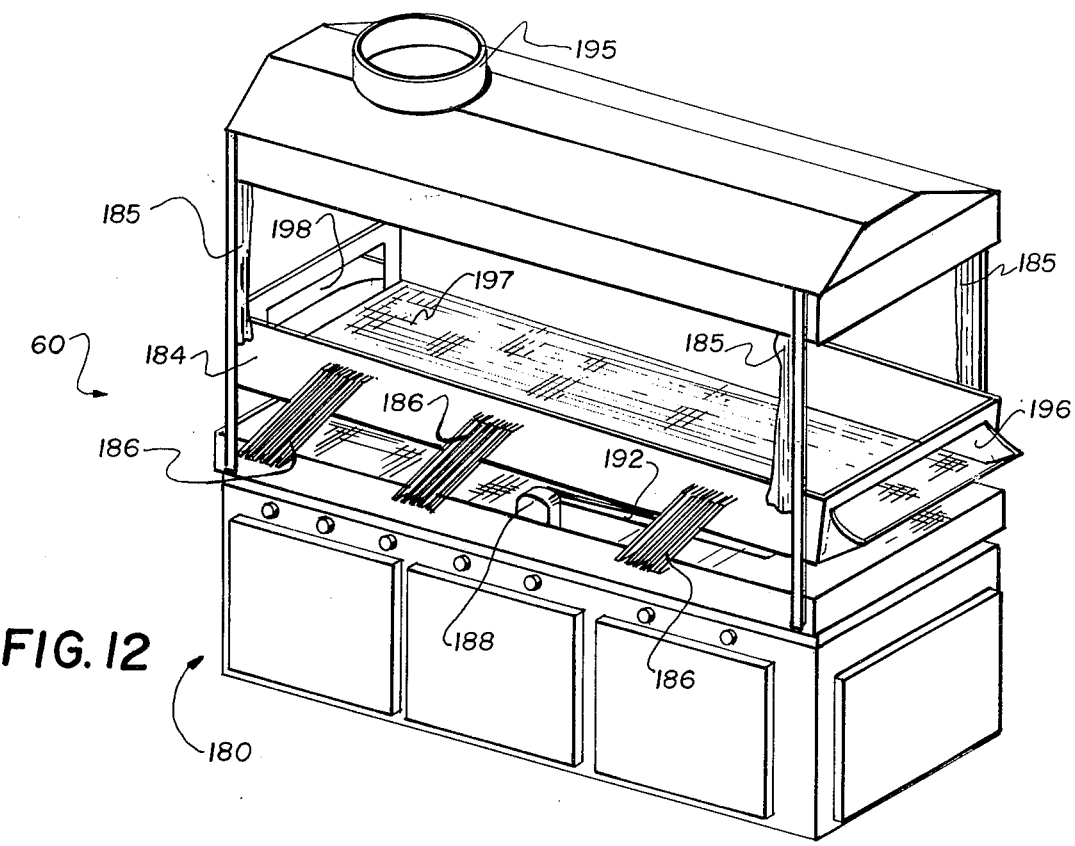
FIG. 12 is a side perspective view of the fluidized bed dryer according to FIG. 1.
Figure 13:
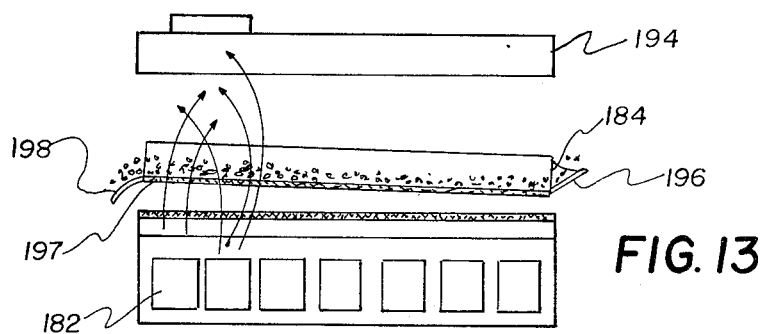
FIG. 13 is a partially cutaway, schematic side view of the fluidized bed dryer of FIG. 12.
Figure 14:
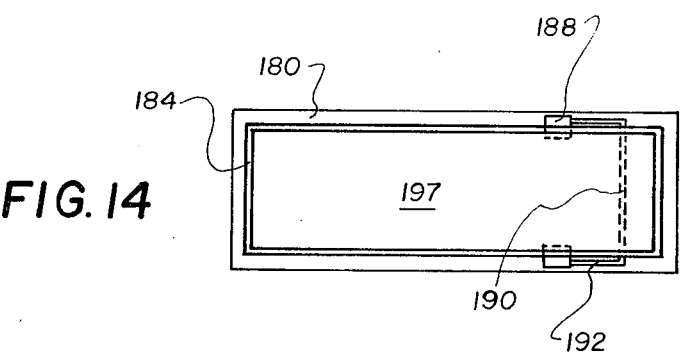
FIG. 14 is a top schematic view of the fluidized bed dryer of FIG. 12.

Referring now to FIGS. 12-14, the fluidized bed dryer 60 is shown. Dryer 60 includes an air chest 180 having a plurality of fans 182 directing air upward to a drying bed 184. Curved fins (not shown) are disposed above fans 182 in order to evenly disburse the air beneath bed 184. The bed is connected to air chest 180 by three sets of springs 186 on each of the two long sides of the bed enabling longitudinal reciprocating motion of bed 184 relative to air chest 180.

A small hydraulic motor 188 is mounted at the top of air chest 180 on each of the two long sides of the bed and is eccentrically connected to a shaft 190 running transversely across bed 184 by a pittman arm 192. A dust hood 194 is mounted above bed 184 to collect the dust and dried husks and to serve as an air outlet for the air generated by fans 182. Input port 196 feeds the kernels and husks onto a fine wire mesh screen 197 on bed 184 and out the discharge port 198 at the other end of the bed. A canvas curtain 185 is hung along both sides of bed 184 to confine the air in an upward flowing direction toward hood 194.

In operation, one end of bed 184 is elevated above the other end so that screen 197 is tilted slightly upward in the direction of travel. The longitudinal reciprocating motion of the bed caused by motors 188 moves the product up the slightly inclined wire mesh screen 197. The even flow of air from fans 182 upward through screen 197 working in conjunction with the reciprocating motion of bed 184 partially suspends the product in a fluidized mode so as to optimize drying and separation of the kernels and husks. The upward tilted bed slows the travel of the product toward discharge port 198 thereby enabling the necessary drying before the product reaches the end of the bed. Springs 186 mounted on both sides of the bed accentuate the longitudinal rocking motion and maintain the bed in alignment over the air chest 180.

In one preferred embodiment, the air chest and bed of dryer 60 are conventional components of a gravity separator such as the model 240 gravity separator manufactured by Oliver Manufacturing Company of Rocky Ford, Colo. Hydraulic motor 188 is preferably a Char-Lynn model H motor manufactured by Eaton Corporation of Eden, Minn. The screen surface 197 of bed 184 is preferably a 60 mesh stainless steel screen. Normal retention time for drying milo kernels and husks is preferably about five to seven minutes.

In operating the system of the present invention, one of the major advantages is the simplification and shortening of the processing and drying time. After the dehusking process, as the kernels and husks come out of the dewatering unit, the mixture has about 30% to 35% moisture content, preferably about 33%. Substantial drying takes place in the fluidized bed dryer 60 as previously mentioned. The husks are dried and aspirated and the surface moisture on the kernels is removed. Consequently, as the kernels are directed to the germ detacher 64 the moisture content has dropped to about 20% to 25%, preferably about 22%.

In this regard, it should be noted that, with conventional cracking units such as a roller mill, it was necessary to dry the milo or other grain substantially more, usually down to about 12% moisture content, before cracking out the germ. In contrast, using the germ detacher 64 of the present invention, it is preferable to operate at a relatively high moisture content of about 22% because a cleaner separation of the germ and oil from the kernel is obtained using this type of impact mechanism with the relatively high moisture content of the kernel. As a result, drying time is reduced from about two hours using prior art systems to about seven minutes using the present invention, thus providing a significant savings in fuel.

Moreover, the use of the germ detacher 64 to break loose the germ from the endosperm and other starchy particles of a relatively wet kernel is more likely than prior art systems to achieve a clean break and not coat the rest of the starchy particles with the oil. Consequently, a grit can be produced for the brewry trade or other uses which requires a low fat content. In contrast, using a roller mill to crack kernels having the same moisture content would result in the oil being rolled out and smeared over the starchy particles to provide a high fat content product with an unattractive grayish cast. Moreover, the clean separation of oil from the kernel using the present invention enables effective recovery of the oil and germ for use as animal feed or for vegetable oil products.

As the cracked particles move from the germ detacher 64 through the pneumatic conveyer lines, filters and sifters to the grinder an additional 4% or 5% moisture content is removed. Thus, the grain is typically at about 15% to 20% moisture, preferably about 18%, when it reaches grinder 74. Grinding is performed at this relatively high moisture content compared to most prior art processing, thus minimizing the gritty aftertaste which has been present in conventionally-ground milo flour. Finally, by the time the flour has reached the filter and fine sifter stages, 76 and 78 respectively, the moisture content has dropped to about 12% which is satisfactory for the flour or meal finished product. Thus, long separate drying periods using expensive equipment are eliminated with the present invention.

In summary, the foregoing system and methods provide several substantial advantages over the prior art. Overall processing time is substantially reduced from conventional processes, particularly with regard to grain sorghums such as milo. There is also a substantial reduction in fuel costs because drying time is substantially lower than with prior art systems. The use of hydraulic motors to power the system adds substantial flexibility in enabling the processing of different types of grains at different speeds, as well as in reducing the overall operational costs. Most importantly, the processed flour or meal and grit products from grain sorghums are usable for human consumption because of the usual bitter and gritty aftertaste and unappetizing grayish appearance have been eliminated. Moreover, the oil and germ are separately recoverable as well as husks and other feed byproducts for animal consumption.

Although a specific embodiment of the present invention has been shown and described, it is understood that numerous variations and modifications can be made within the scope of the present invention. For example, the hydraulic dehusker 56 might alternately be constructed in the form of a single, long cylinder having a rotatable shaft extending the length of the cylinder with a plurality of blade members spaced along the shaft.

I claim:

1. A method of processing grain comprising the steps of:
    mixing water with the grain to form a slurry;
    pumping the slurry successively in a turbulent flow through a plurality of pump stages, to separate the husks from the kernels of the grain without cracking a substantial percentage of the kernels;
    removing excess water from the grain slurry to leave moist kernels and moist husks;
    surface drying the moist kernels and moist husks to leave a surface dried mixture of husks and kernels, and then
    aspirating the surface dried mixture to remove the husks from the kernels.

2. The method according to claim 1 wherein the step pf pumping the slurry to separate the husks comprises passing the slurry by a plurality of rotating impellers to work the husks loose from the kernels.

3. The method according to claim 1 wherein the step of removing the water from the slurry comprises passing the slurry through a vibrating dewatering unit.

4. The method according to claim 1 wherein the step of surface drying comprises passing the grain over a mesh screen in motion while passing an air flow through said screen.

5. The method according to claim 1 wherein the step of pumping comprises reducing the pressure build-up in said pump stages using pressure reducing valve means positioned between certain of said pumping stages to maintain a low pumping pressure.

6. The method according to claim 1 wherein each of the pumping stages utilizes a low efficiency open bowl turbine pump.

7. The method according to claim 1 wherein the grain is a sorghum.

8. The method according to claim 7 wherein the sorghum is milo.

9. The method according to claim 1 further comprising the step of cracking the aspirated kernels.

10. The method according to claim 9 wherein the step of cracking is performed by impacting grain having a moisture content of from 20% to 25%.

11. The method according to claim 9 wherein the step of cracking includes separating the germ and oil from the endosperm of the kernels.

12. The method according to claim 9 wherein the step of cracking is performed by directing the grain against a fan having flat blades extending radially outward from a central rotating shaft.

13. The method according to claim 12 wherein the grain is directed to impact only a predetermined portion of each blade to provide uniform cracking.

14. The method according to claim 1 wherein the mixing step comprises mixing approximately two pounds of water to one pound of grain.

15. The method of claim 9 and further comprising the steps of sizing and separating the cracked kernels and milling the sized kernels into flour.

16. The method according to claim 15 wherein the milling step comprises impact grinding said grain.

17. The method according to claim 1 wherein the grain is wheat and further comprising the step of milling the wheat kernels, resulting from aspirating the wheat, to form flour.

18. The method according to claim 1 wherein the grain is corn and further comprising the steps of:
   steam cooking the kernels;
   wet grinding the cooked kernels; and
   drying the ground kernels.

19. The method according to claim 18 wherein the ground kernels are air column dried.

20. A method of processing grain comprising the steps of:
   mixing water with grain to form a slurry;
   pumping the slurry through a turbulent flow path to separate the husks from the kernels of the grain without cracking a substantial percentage of the kernels;
   removing excess water from the grain slurry to leave moist kernels and moist husks;
   surface drying the moist kernels and moist husks to leave a surface dried mixture of husks and kernels with a moisture content having a range of about 20% to 25%;
   aspirating the surface dried mixture to remove the husks from the kernels; and
   cracking the kernels having said moisture content to break the kernels into particles and to separate the germ and oil from the endosperm of the kernels.

21. The method of claim 20 wherein the step of removing the water from the slurry comprises reducing the water content of the grain to about 30% to 35%.

22. The method of claim 20 and further comprising milling the cracked grain while said grain is at about 15% to 20% moisture content.

23. A method of processing grain comprising the steps of:
   mixing water with the grain to form a slurry;
   pumping the slurry successively in a flow through a plurality of pump stages, each pump stage having a rotatable shaft attached thereto, driven by a motor, with an impeller mounted on the shaft, including the step of rotating the impellers to provide a turbulent flow of slurry in the pump stages, and pumping the slurry in turbulent flow through the pump stages so as to separate the husks from the kernels of the grain without cracking a substantial percentage of the kernels;
   removing excess water from the grain slurry to leave moist kernels and moist husks;
   surface drying the moist kernels and moist husks to leave a surface dried mixture of husks and kernels; and then
   aspirating the surface dried mixture to remove the husks from the kernels.

24. The method of claim 23 and further comprising varying the rate of rotation of said shaft by varying the revolutions per minute of the motor driving the shaft to change the retention time fo said slurry in the pump stages.

25. The method of claim 23 and further comprising controlling the fluid pressure of the slurry between successive pump stages to maintain said fluid pressure below an undesirable level and to vary the retention time of said slurry in the pump stages.

26. The method of claim 23 wherein each pump stage includes a housing member disposed adjacent said blade member, including the step of spacing said housing member and said blade member a distance apart from each other to provide a flow path for said slurry, said distance providing sufficient space for the pump to pass the grain as a whole kernel.

27. A method of processing grain comprising the steps of:
   mixing water with the grain to form a slurry;
   pumping the slurry successively through a plurality of pump stages, each stage having a turbine pump, and having a turbine pump impeller in each turbine pump raised to provide sufficient clearance for the pump to pass the grain as a whole kernel and separate the husks from the kernels of the grain without cracking a substantial percentage of the kernels;
   removing the water from the grain slurry;
   surface drying the grain; and then
   aspirating the grain to remove the husks from the kernels.

* * * * *